United States Patent
Rajkotia et al.

(10) Patent No.: US 7,317,920 B2
(45) Date of Patent: Jan. 8, 2008

(54) SYSTEM AND METHOD FOR PROVIDING FAST CALL SET-UP IN A WIRELESS COMMUNICATION SYSTEM

(75) Inventors: Purva R. Rajkotia, Plano, TX (US); Jey Veerasamy, Richardson, TX (US); Sanjaykumar Kodali, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 475 days.

(21) Appl. No.: 10/659,449

(22) Filed: Sep. 10, 2003

(65) Prior Publication Data

US 2005/0037765 A1 Feb. 17, 2005

Related U.S. Application Data

(60) Provisional application No. 60/495,462, filed on Aug. 15, 2003.

(51) Int. Cl.
*H04Q 7/20* (2006.01)
*H04J 3/06* (2006.01)

(52) U.S. Cl. ...................................... 455/450; 370/355

(58) Field of Classification Search ................ 455/450, 455/445, 38.3, 70, 54.1, 54.2, 436, 343, 33.2, 455/39, 7, 438, 343.1; 370/355, 331, 349, 370/352, 357

See application file for complete search history.

(56) References Cited

U.S. PATENT DOCUMENTS

| | | | | |
|---|---|---|---|---|
| 6,377,572 | B1 * | 4/2002 | Dolan et al. | 370/355 |
| 6,442,152 | B1 * | 8/2002 | Park et al. | 370/341 |
| 6,473,501 | B1 * | 10/2002 | Paulsrud | 379/157 |
| 2003/0193915 | A1 * | 10/2003 | Lee et al. | 370/335 |
| 2003/0193964 | A1 * | 10/2003 | Bae et al. | 370/465 |
| 2003/0231608 | A1 * | 12/2003 | Wentink | 370/338 |
| 2005/0014506 | A1 * | 1/2005 | Thorson et al. | 455/450 |
| 2005/0032551 | A1 * | 2/2005 | Lee et al. | 455/560 |

* cited by examiner

*Primary Examiner*—Naghmeh Mehrpour

(57) ABSTRACT

A system and method is provided for fast call set-up in a wireless communication system. A base station sets up a call from a mobile station by sending null frames to the mobile station on a forward traffic channel instead of sending a base station acknowledgement order. The mobile station sends a traffic channel preamble to the base station on a reverse traffic channel instead of sending a mobile station acknowledgment order. The fast call set-up procedure of the present invention reduces the call set-up time from approximately two (2) to three (3) seconds to approximately two hundred milliseconds (200 msec) to three hundred milliseconds (300 msec).

30 Claims, 9 Drawing Sheets

SYSTEM AND METHOD FOR PROVIDING FAST CALL SET-UP IN A WIRELESS COMMUNICATION SYSTEM

TECHNICAL FIELD OF THE INVENTION

This application claims priority from U.S. Provisional Patent Application 60/495,462, for "SYSTEM AND METHOD FOR PROVIDING FAS CALL SET-UP IN A WIRELESS COMMUNICATION SYSTEM" filed 15 Aug. 2003, which is hereby incorporated by reference. The disclosure of U.S. Provisional Patent Application 60/495,462 is hereby incorporated by reference into the present application.

BACKGROUND OF THE INVENTION

Wireless communication systems, including cellular phones, paging devices, personal communication services (PCS) systems, and wireless data networks, have become ubiquitous in society. Wireless service providers continually try to create new markets for wireless devices and to expand existing markets by making wireless devices and services cheaper and more reliable. The price of end-user wireless devices, such as cell phones, pagers, PCS systems, and wireless modems, has been driven down to the point where these devices are affordable to nearly everyone and the price of a wireless device is only a small part of the end-user's total cost. To continue to attract new customers, wireless service providers concentrate on reducing infrastructure costs and operating costs, and on increasing handset battery lifetime, while improving quality of service in order to make wireless services cheaper and better.

To maximize usage of the available bandwidth, a number of multiple access technologies have been implemented to allow more than one subscriber to communicate simultaneously with each base station (BS) in a wireless system. These multiple access technologies include time division multiple access (TDMA), frequency division multiple access (FDMA), and code division multiple access (CDMA). These technologies assign each system subscriber to a specific traffic channel that transmits and receives subscriber voice/data signals via a selected time slot, a selected frequency, a selected unique code, or a combination thereof.

CDMA technology is used in wireless computer networks, paging (or wireless messaging) systems, and cellular telephony. In a CDMA system, mobile stations and other access terminals (e.g., pagers, cell phones, laptop PCs with wireless modems) and base stations transmit and receive data on the same frequency in assigned channels that correspond to specific unique orthogonal codes. For example, a mobile station may receive forward channel data signals from a base station that are convolutionally coded, formatted, interleaved, spread with a Walsh code and a long pseudo-noise (PN) sequence. In another example, a base station may receive reverse channel data signals from the mobile station that are convolutionally encoded, block interleaved, modulated by a 64-ary orthogonal modulation, and spread prior to transmission by the mobile station. The data symbols following interleaving may be separated into an in-phase (I) data stream and a quadrature (Q) data stream for QPSK modulation of an RF carrier. One such implementation is found in the TIA/EIA-95 CDMA standard (also known as IS-95). Another implementation is the TIA/EIA-2000 standard (also known as IS-2000).

The current generation of cellular phones is used primarily for voice conversations between a subscriber device (or wireless device) and another party through the wireless network. A smaller number of wireless devices are data devices, such as personal digital assistants (PDAs) equipped with cellular/wireless modems. Because the bandwidth for a current generation wireless device is typically limited to a few tens of kilobits per second (kbps), the applications for the current generation of wireless devices are relatively limited. However, this is expected to change in the next (or third) generation of cellular/wireless technology, sometimes referred to as "3G" cellular/wireless, where much greater bandwidth will be available to each wireless device (i.e., one hundred twenty five thousand bits per second (125 kbps) or greater). The higher data rates will make Internet applications for wireless devices much more common. For instance, a 3G cellular telephone (or a PC with a 3G cellular modem) may be used to browse web sites on the Internet, to transmit and receive graphics, to execute streaming audio or video applications, and the like. A much higher percentage of the wireless traffic handled by 3G cellular systems will be Internet protocol (IP) traffic and a lesser percentage will be traditional voice traffic.

Real-time streaming of multimedia content over Internet protocol (IP) networks has become an increasingly common application in recent years. As noted above, 3G wireless networks will provide streaming data (both video and audio) to wireless devices for real time applications. A wide range of interactive and non-interactive multimedia Internet applications, such as news on-demand, live TV viewing, video conferencing, live radio broadcasting (such as Broadcast.com), and the like, will provide "real time" data streaming to wireless devices. Unlike a "downloaded" video file, which may be retrieved first in "non-real" time and viewed or played back later, real time (or streaming) data applications require a data source to encode and to transmit a streaming data signal over a network to a receiver, which must decode and play the signal (video or audio) in real time.

In presently existing CDMA wireless communication networks it takes about two (2) to three (3) seconds to set a call to a mobile station (MS). Because the presently existing CDMA wireless communication networks are designed to implement a circuit switched voice model, a set-up time of several seconds has generally been deemed acceptable in terms of user expectations.

However, as CDMA systems have evolved to process increasingly greater levels of data packet traffic, the originally designed call set-up procedures have not received much attention from system engineers. The time required to carry out a call set-up procedure for a call to or from a mobile station has remained unchanged. This has had an adverse impact on CDMA packet data applications. Specifically, a call set-up procedure that requires two (2) to three (3) seconds creates an unnecessary delay for initiating or terminating CDMA applications such as Voice over Internet Protocol (VoIP), CDMA packet data calls, etc.

Therefore, there is a need for improved wireless network equipment and services for providing a faster call set-up procedure. In particular, there is a need for a system and method for providing a faster call set-up procedure for initiating a call to or from a mobile station in a wireless communication network. There is also a need for a system and method for providing a faster call termination procedure for terminating a call to or from a mobile station in a wireless communication network.

SUMMARY OF THE INVENTION

To address the above-discussed deficiencies of the prior art, it is a primary object of the present invention to provide a system and method for providing a fast call set-up procedure for initiating a call to or from a mobile station in a wireless communication network.

In the present invention a base station sets up a call from a mobile station by sending null frames to the mobile station on a forward traffic channel instead of sending a base station acknowledgement order. The reliability of the forward traffic channel is verified by the null frames. In response, the mobile station sends a traffic channel preamble to the base station on a reverse traffic channel instead of sending a mobile station acknowledgment order. The reliability of the reverse traffic is channel is verified by the traffic channel preamble. By omitting the transmission of the base station acknowledgement order and the transmission of the mobile station acknowledgement order it is possible to reduce the call set-up time from approximately two (2) to three (3) seconds to approximately two hundred milliseconds (200 msec) to three hundred milliseconds (300 msec).

In an advantageous embodiment of a first method of the present invention, a call completion is indicated by using the transmission of null frames and traffic channel preambles instead of using the transmission of base station acknowledgement orders, mobile station acknowledgement orders, Service Connect Messages (SCM) or Service Connect Completion Messages (SCCM).

In an advantageous embodiment of a second method of the present invention, the base station provides a specified number of traffic channel preambles to mobile station in a Channel Assignment Message (CAM) or in an Extended Channel Assignment Message (ECAM). The mobile station sends the specified number of traffic channel preambles to the base station and then immediately enters a traffic channel without waiting for a base station acknowledgement order from the base station.

In an advantageous embodiment of an alternate version of the second method of the present invention, the base station provides a specified number of traffic channel preambles to mobile station in a Channel Assignment Message (CAM) or in an Extended Channel Assignment Message (ECAM). The mobile station begins to send the specified number of traffic channel preambles to the base station. The mobile station immediately enters a traffic channel when the mobile station receives a base station acknowledgement order from the base station even if the mobile station has not finished sending all of the specified number of traffic channel preambles to the base station.

In an advantageous embodiment of an alternate version of a third method of the present invention, a call completion is indicated by sending null frames from the mobile station to the base station and the sending a continuous stream of null frames or base station acknowledgement orders from the base station to the mobile station.

It is an object of the present invention to provide a base station that is capable of providing a fast call set-up procedure for initiating a call to or from a mobile station in a wireless communication network.

It is also an object of the present invention to provide a base station that is capable of sending null frames to a mobile station on a forward traffic channel instead of sending a base station acknowledgement order.

It is another object of the present invention to provide a mobile station that is capable of sending a traffic channel preamble to a base station on a reverse traffic channel instead of sending a mobile station acknowledgement order.

It is yet another object of the present invention to provide a base station that is capable of causing a mobile station to send a specified number of traffic channel preambles to the base station before the mobile station goes to a traffic channel.

It is an additional object of the present invention to provide a base station that is capable of sending a mode of operation indicator to a mobile station to cause the mobile station to enter a particular mode of operation.

It is also an object of the present invention to provide a system and method that is capable of reducing a call set-up time from approximately two (2) to three (3) seconds to approximately two hundred milliseconds (200 msec) to three hundred milliseconds (300 msec).

The foregoing has outlined rather broadly several features of this disclosure so that those skilled in the art may better understand the Detailed Description of the Invention that follows. Additional features may be described later in this document. Those skilled in the art should appreciate that they may readily use the concepts and the specific embodiments disclosed as a basis for modifying or designing other structures for carrying out the same purposes of this disclosure. Those skilled in the art should also realize that such equivalent constructions do not depart from the spirit and scope of the invention in its broadest form.

Before undertaking the Detailed Description of the Invention below, it may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, or software, or a combination of at least two of the same. It should be noted that the functionality associated with any particular controller may be centralized or distributed, whether locally or remotely. Definitions for certain words and phrases are provided throughout this patent document, and those of ordinary skill in the art should understand that in many, if not most instances, such definitions apply to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 9, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged telecommunications network.

Figure 1:
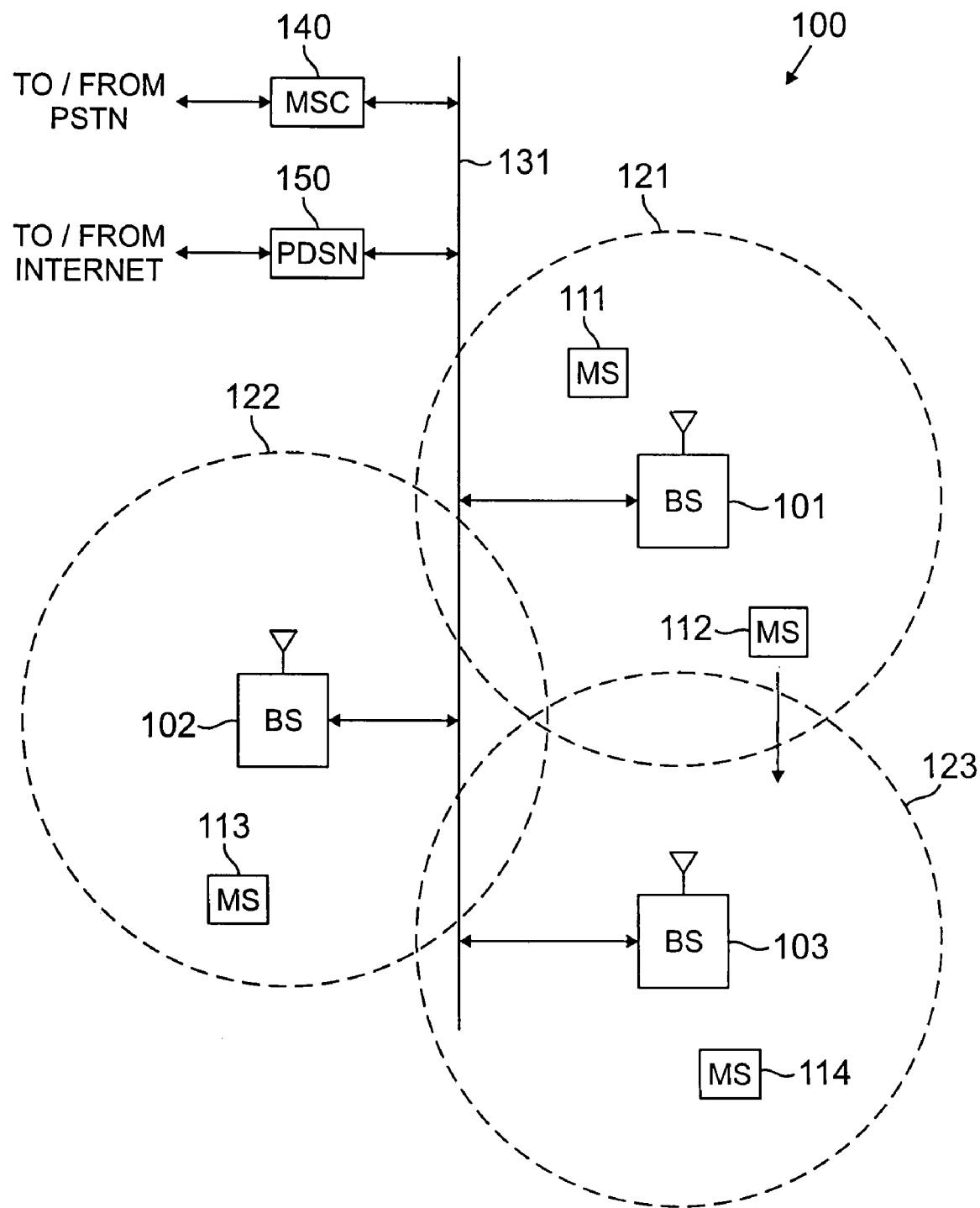
FIG. 1 illustrates an exemplary wireless network according to an advantageous embodiment of the present invention.

FIG. 1 illustrates exemplary wireless network 100 according to one embodiment of the present invention. Wireless network 100 comprises a plurality of cell sites 121-123, each containing one of the base stations, BS 101, BS 102, or BS 103. Base stations 101-103 communicate with a plurality of mobile stations (MS) 111-114 over code division multiple access (CDMA) channels. Mobile stations 111-114 may be any suitable wireless devices, including conventional cellular radiotelephones, PCS handset devices, personal digital assistants, portable computers, telemetry devices, and the like, which are capable of communicating with the base stations via wireless links. The present invention is not limited to mobile devices. Other types of access terminals, including fixed wireless terminals, may be used. However, for the sake of simplicity, only mobile stations are shown and discussed hereafter.

Dotted lines show the approximate boundaries of the cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, cell sites 121-123 are comprised of a plurality of sectors (not shown), each sector being illuminated by a directional antenna coupled to the base station. The embodiment of FIG. 1 illustrates the base station in the center of the cell. Alternate embodiments position the directional antennas in corners of the sectors. The system of the present invention is not limited to any one cell site configuration.

In one embodiment of the present invention, BS 101, BS 102, and BS 103 comprise a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces, and RF transmitters and RF receivers. For the purpose of simplicity and clarity in explaining the operation of the present invention, the base transceiver subsystem in each of cells 121, 122, and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. is Line 131 also provides the connection path to transfer control signals between MSC 140 and BS 101, BS 102 and BS 103 used to establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. Those skilled in the art will recognize that the connections on line 131 may provide a transmission path for transmission of analog voice band signals, a digital path for transmission of voice signals in the pulse code modulated (PCM) format, a digital path for transmission of voice signals in an Internet Protocol (IP) format, a digital path for transmission of voice signals in an asynchronous transfer mode (ATM) format, or other suitable connection transmission protocol. Those skilled in the art will recognize that the connections on line 131 may provide a transmission path for transmission of analog or digital control signals in a suitable signaling protocol.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

As is well known to those skilled in the art, the handoff procedure transfers control of a call from a first cell to a second cell. A handoff may be either a "soft handoff" or a "hard handoff." In a "soft handoff" a connection is made between the mobile station and the base station in the second cell before the existing connection is broken between the mobile station and the base station in the first cell. In a "hard handoff" the existing connection between the mobile station and the base station in the first cell is broken before a new connection is made between the mobile station and the base station in the second cell.

As MS 112 moves from cell 121 to cell 123, MS 112 detects the pilot signal from BS 103 and sends a Pilot Strength Measurement Message to BS 101. When the strength of the pilot transmitted by BS 103 and received and reported by MS 112 exceeds a threshold, BS 101 initiates a soft hand-off process by signaling the target BS 103 that a handoff is required as described in TIA/EIA IS-95 or TIA/EIA IS-2000.

BS 103 and MS 112 proceed to negotiate establishment of a communications link in the CDMA channel. Following establishment of the communications link between BS 103 and MS 112, MS 112 communicates with both BS 101 and BS 103 in a soft handoff mode. Those acquainted with the art will recognize that soft hand-off improves the performance on both forward (BS to MS) channel and reverse (MS to BS) channel links. When the signal from BS 101 falls below a predetermined signal strength threshold, MS 112 may then drop the link with BS 101 and only receive signals from BS 103. The call is thereby seamlessly transferred from BS 101 to BS 103. The above-described soft hand-off assumes the mobile station is in a voice or data call. An idle hand-off is the hand-off between cell sites of a mobile station that is communicating in the control or paging channel.

Figure 2:
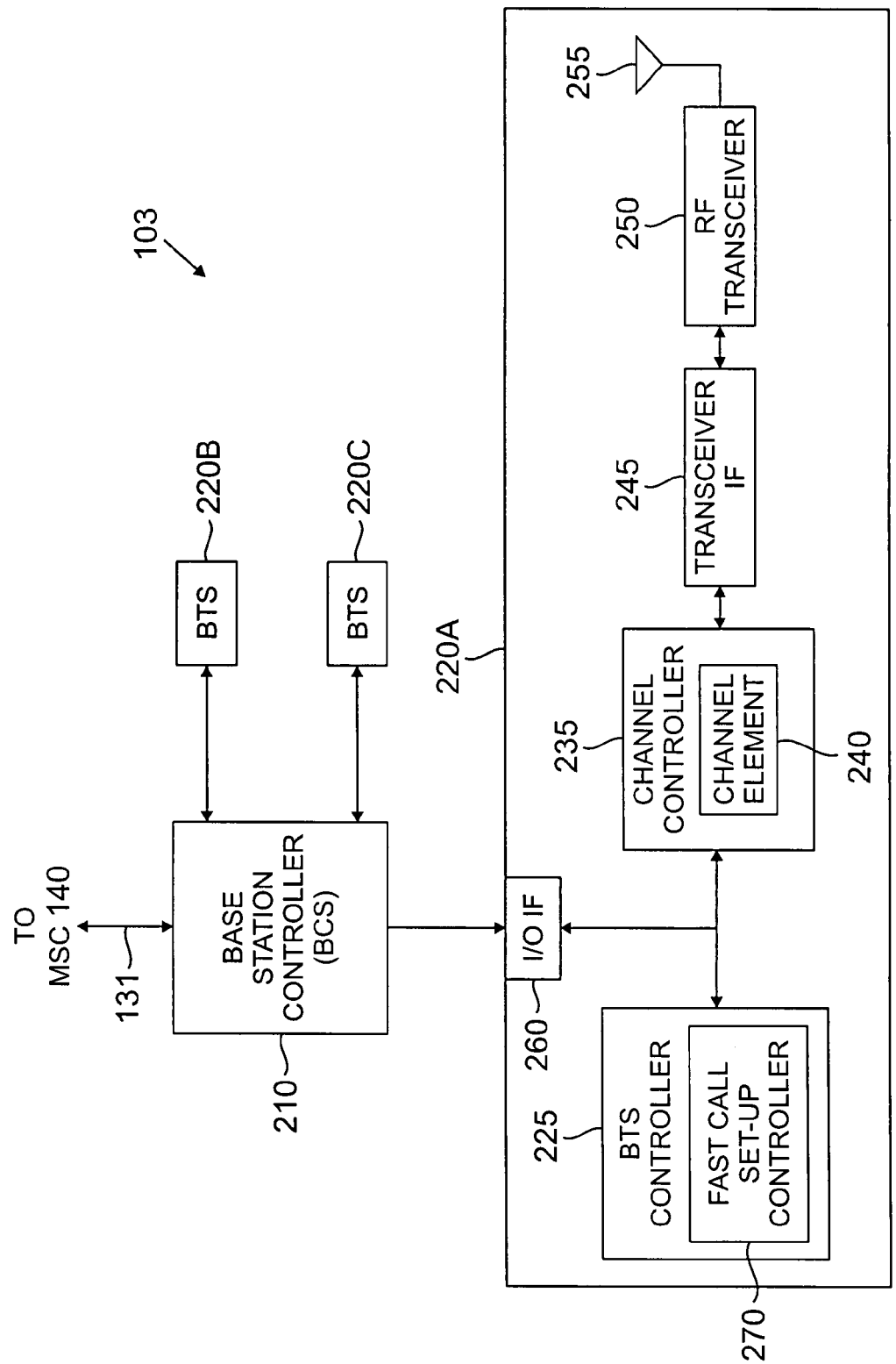
FIG. 2 illustrates an exemplary base station and an exemplary base transceiver station according to an advantageous embodiment of the present invention.

FIG. 2 illustrates exemplary base station 103 and base transceiver subsystem (BTS) 220A according to an advantageous embodiment of the present invention. Base station 103 comprises is base station controller (BSC) 210 and base transceiver subsystems BTS 220A, BTS 220B, and BTS 220C. Base station controllers and base transceiver subsystems were described previously in connection with FIG. 1.

BSC 210 manages the resources in cell site 123, including BTS 220A, BTS 220B, and BTS 220C. As described above, BSC 210 is coupled to MSC 140 over data communication line 131. Exemplary BTS 220A comprises BTS controller 225, channel controller 235 that contains exemplary channel element 240, transceiver interface (IF) 245, RF transceiver unit 250, and antenna array 255. Input/output interface (I/O IF) 260 couples BTS 220A to BSC 210.

BTS controller 225 controls the overall operation of BTS 220A and interfaces with BSC 210 through I/O IF 260. BTS controller 225 directs the operation of channel controller 235. Channel controller 235 contains a number of channel elements such as channel element 240. The channel elements perform bi-directional communications in the forward and reverse links. Depending on the air interface used by the system of BS 103, the channel elements engage in time division multiple access (TDMA), frequency division multiple access (FDMA), or code division multiple access (CDMA) communications with the mobile stations in cell 123.

Transceiver IF 245 transfers the bi-directional channel signals between channel controller 235 and RF transceiver 250. Transceiver IF 245 converts the radio frequency signal from RF transceiver 250 to an intermediate frequency (IF). Channel controller 235 then converts this intermediate frequency (IF) to baseband frequency. Additionally, RF transceiver 250 may contain an antenna selection unit to select among different antennas in antenna array 255 during both transmit and receive operations.

Antenna array 255 comprises a number of directional antennas that transmit forward link signals, received from RF transceiver 250, to mobile stations in the sectors covered by BS 103. Antenna array 255 also receives reverse link signals from the mobile stations and sends the signals to RF transceiver 250. In a preferred embodiment of the present invention, antenna array 255 is a multi-sector antenna, such as a six-sector antenna, in which each antenna is responsible for transmitting and receiving in a sixty degree (60°) arc of coverage area.

BS 103 of the present invention is not limited to the architecture described above. The architecture may be different depending on the type of air interface standard used by the wireless system. Additionally, the present invention is not limited by the frequencies used. Different air interface standards require different frequencies.

In an advantageous embodiment of the present invention, BTS controller 225 comprises a microprocessor (also known as a microcontroller) and a memory unit. The microprocessor and memory unit of BTS controller 225 are not shown in FIG. 2. BTS controller 225 is capable of executing software applications stored in the memory unit. BTS controller 225 also comprises a fast call set-up controller 270. As will be more fully described, fast call set-up controller 270 is capable of carrying out the present invention. Fast call set-up controller 270 is an integral part of BTS controller 225.

Figure 3:
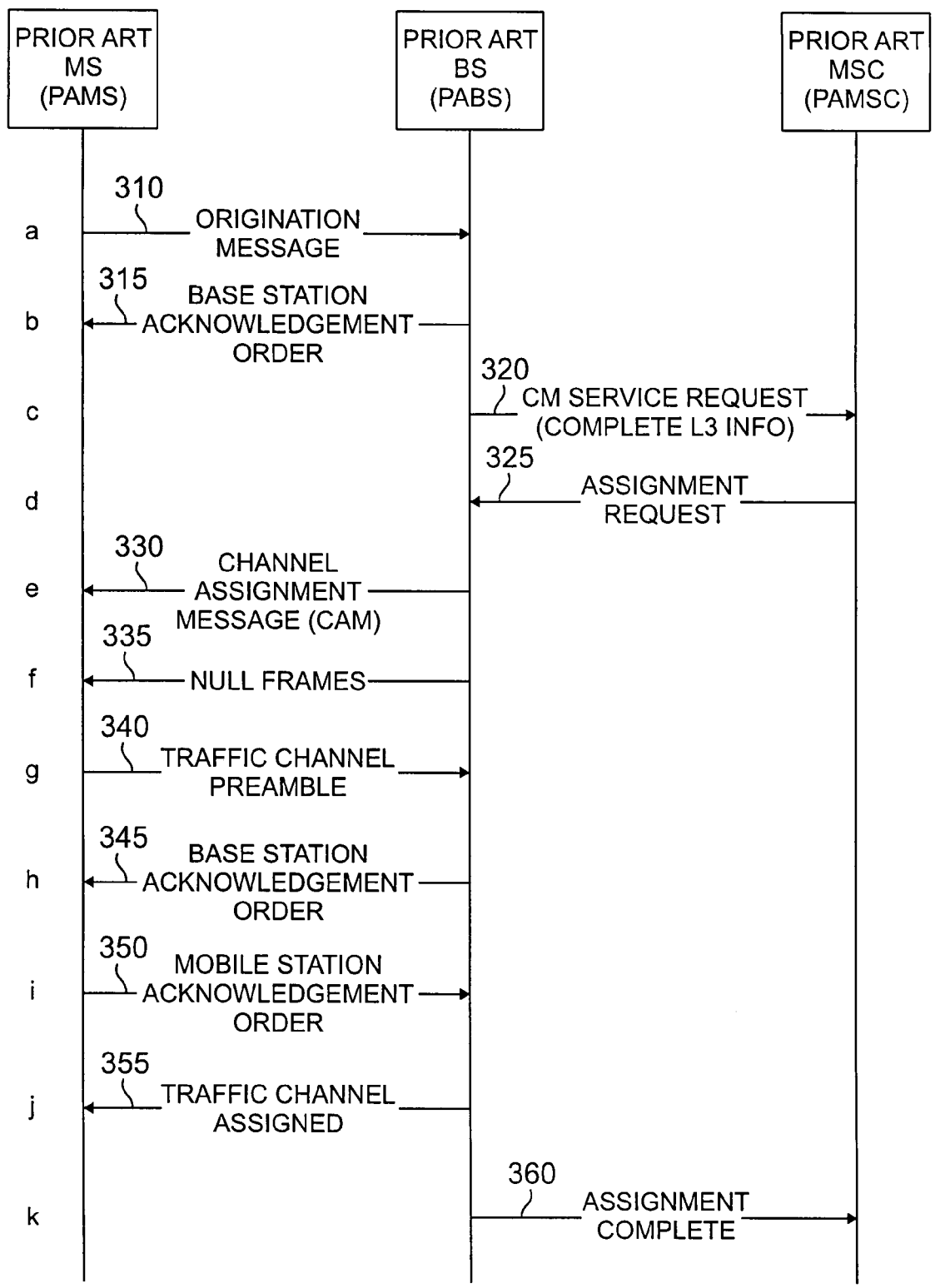
FIG. 3 illustrates a chart of call flows showing a prior art call set-up procedure for originating a call from a mobile station in a wireless network.

FIG. 3 illustrates a chart of call flows showing a typical prior art call set-up procedure for originating a call from a prior art mobile station (referred to as PAMS). Assume that the prior art mobile station PAMS is approaching a prior art base station (referred to as PABS) in the same manner as mobile station 112 is approaching base station 103 as shown in FIG. 1. At time "a" mobile station PAMS sends an Origination Message 310 to base station PABS on a reverse traffic channel. At time "b" base station PABS sends a Base Station Acknowledgement Order 315 to mobile station PAMS. A Base Station Acknowledgement Order is sometimes abbreviated as "BS ACK Order."

At time "c" base station PABS sends a Configuration Management (CM) Service Request message 320 to prior art mobile switching center (referred to as PAMSC) in a Complete Layer 3 (L3) information message. At time "d" prior art PAMSC sends an Assignment Request message 325 to base station PABS. At time "e" base station PABS sends a Channel Assignment Message (CAM) 330 to mobile station PAMS. At time "f" base station PABS sends null frames 335 to mobile station PAMS. At time "g" mobile station PAMS sends a Traffic Channel Preamble 340 to base station PABS.

In response, at time "h" base station PABS sends a Base Station Acknowledgement Order 345 back to mobile station PAMS. Then at time "i" mobile station PAMS sends a Mobile Station Acknowledgment Order 350 back to base station PABS. At time "j" base station PABS sends a Traffic Channel Assigned message 355 to mobile station PAMS. Finally, at time "k" base station PABS sends an Assignment Complete message 360 to mobile switching center PAMSC. These typical prior art call set-up messages require a total of approximately two (2) to three (3) seconds.

The present invention is able to perform a fast call set-up in significantly less time than the time required by prior art systems. In particular, the present invention can reduce the call set-up time to less than approximately one fourth (¼) of the typical prior art call set-up time.

Figure 4:
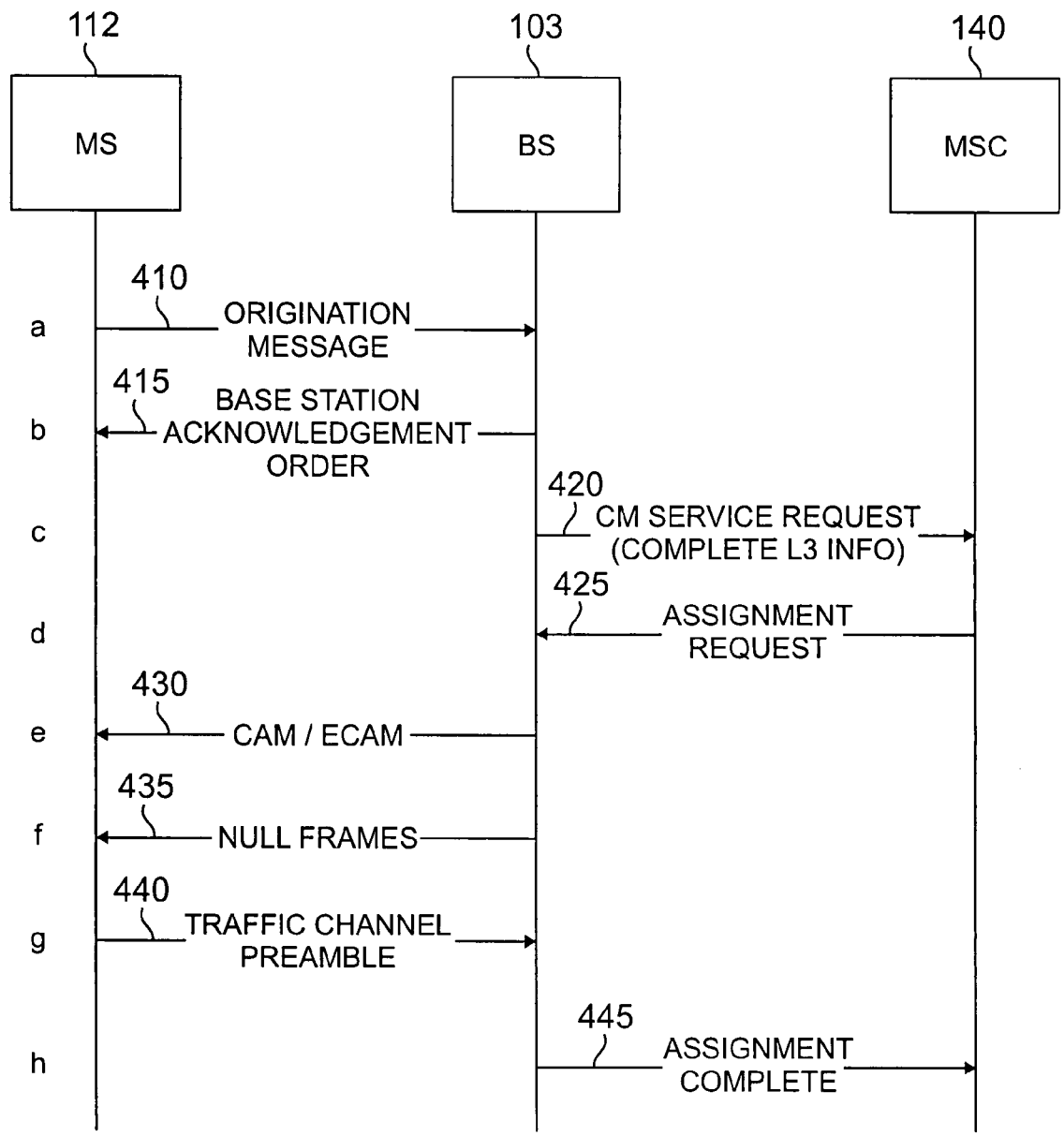
FIG. 4 illustrates a chart of call flows showing an advantageous embodiment of a first method of a fast call set-up procedure of the present invention for originating a call from a mobile station in a wireless network.

Consider, for example, an advantageous embodiment of the first method of a fast call set-up procedure of the present invention as shown in FIG. 4. Mobile station (MS) 112 of the present invention is approaching base station (BS) 103 of the present invention in the manner shown in FIG. 1. At time "a"

MS 112 sends an Origination Message 410 to BS 103 on a reverse traffic channel. At time "b" BS 103 sends a Base Station Acknowledgement Order 415 to MS 112.

At time "c" BS 103 constructs a Configuration Management (CM) Service Request message 420 and sends it to mobile switching center (MSC) 140 in a Complete Layer 3 (L3) information message. BS 103 may request MSC 140 to allocate a preferred terrestrial circuit. If a global challenge is used, MSC 140 will continue to set up the call while waiting to receive authentication information. If MSC 140 receives an authentication failure indication, then MSC 140 may clear the call.

At time "d" MSC 140 sends an Assignment Request message 425 to BS 103 to request assignment of resources. Assignment Request message 425 includes information concerning the terrestrial circuit, if a terrestrial circuit is to be used between BS 103 and MSC 140. If a traffic channel is available for the call, at time "e" base station BS 103 sends a Channel Assignment Message (CAM) 430 (Granted Mode=10) or an Extended Channel Assignment Message (ECAM) 430 (Granted Mode=11) over the Paging Channel to MS 112 to initiate the establishment of a radio traffic channel.

At time "f" BS 103 sends null frames 435 to MS 112 on the is forward traffic channel. As soon as MS 112 finds good null frames 435 on the forward traffic channel, MS 112 will start transmitting a Traffic Channel Preamble message 440 on the reverse traffic channel. Therefore, at time "g" MS 112 sends the Traffic Channel Preamble message 440 to BS 103 over the designated reverse traffic channel.

At this point the fast call set-up procedure of the present invention differs from the prior art call set-up procedure described with reference to FIG. 3. In the fast call set-up procedure of the present invention the Base Station Acknowledgement Order 345, the Mobile Station Acknowledgement Order 350, and the Traffic Channel Assigned message 355 of the prior art procedure are omitted. After BS 103 receives Traffic Channel Preamble message 440 from MS 112, at time "h" BS 103 sends an Assignment Complete message 445 to MSC 140. At this time BS 103 considers the call to be in a conversation state. In prior art call set-up procedures a call is deemed to be completed when a Service Connect Completion Message (not shown in FIG. 3) is issued.

The total time interval for the fast call set-up described in FIG. 4 is approximately one hundred eighty milliseconds (180 msec). The time interval between the Origination Message 410 from MS 112 and the CAM/ECAM message 430 from BS 103 is approximately one hundred milliseconds (100 msec). The time interval that is actually observed will depend upon the speed of MSC 140. The time interval between the CAM/ECAM message 430 from BS 103 and the Assignment Complete message 445 from BS 103 is approximately one hundred milliseconds (100 msec). It is possible to reduce this time interval to as little as eighty milliseconds (80 msec).

The present invention removes the prior art Base Station Acknowledgement Order 345 ("BS ACK Order 345"). The prior art BS ACK Order 345 is used to determine whether the forward traffic channel link is reliable. In the present invention the null frames 435 sent with the CAM/ECAM message 430 in the forward traffic channel perform this function.

The present invention removes the prior art Mobile Station Acknowledgement Order 350 ("MS ACK Order 350"). The prior art MS ACK Order 350 is used to determine whether the reverse traffic channel link is reliable. In the present invention the Traffic Channel Preamble message 440 performs this function. In addition, the present invention removes the prior art Traffic Channel Assigned message 355. The reduction in the time interval required to set up a call is obtained (1) by removing the BS ACK Order 345 and the MS ACK Order 350, and (2) by removing prior art service negotiations between a Service Connect Message (SCM) and a Service Connect Completion Message (SCCM). The Service Connect Message (SCM) and the Service Connect Completion Message (SCCM) are not shown in FIG. 3.

The fast call set-up procedure described with reference to FIG. 4 is the first of three methods of operation for providing a fast call-up procedure of the present invention. The second method of operation will be described with reference to FIG. 5. An alternate version of the second method of operation will be described with reference to FIG. 6. The third method of operation will be described with reference to FIG. 7.

In the first method of operation (FIG. 4) MS 112 transmits Traffic Channel Preamble 440 as soon as MS 112 receives good null frames 435 from BS 103. MS 112 then goes immediately to the traffic channel. In the second method of operation (FIG. 5) BS 103 specifies to MS 112 (in the CAM/ECAM message) how many times MS 112 is to send a Traffic Channel Preamble (e.g., five (5) times) before going to the traffic channel.

In the alternate version of the second method of operation (FIG. 6) BS 103 specifies to MS 112 (in the CAM/ECAM message) how many times MS 112 is to send a Traffic Channel Preamble (e.g., five (5) times) before going to the traffic channel. But in the alternate version of the second method of operation if BS 103 acquires the traffic channel before all of the specified Traffic Channel Preambles are sent by MS 112, then BS 103 sends a Base Station Acknowledgement Order to MS 112 so that MS 112 does not have to send the remaining number of Traffic Channel Preambles.

MS 112 has an internal timer (not shown). If MS 112 does not receive a Base Station Acknowledgment Order from BS 103 within a specific period of time after MS 112 has started sending user traffic, then MS 112 will stop transmitting user traffic and resume sending traffic channel preambles to BS 103.

To implement the second method of operation for providing a fast call-up procedure, a two (2) bit "Mode of Operation" field is added to the Extended Channel Assignment Message (ECAM). The following table shows the "Mode of Operation" field for the second method of operation of the present invention.

TABLE ONE

| Mode of Operation Bits | Description of MS 112 Actions |
| --- | --- |
| 00 | Current mode of operation |
| 01 | Transmit the specified number of Traffic Channel Preambles and then go to the traffic channel |
| 10 | Begin to transmit the specified number of Traffic Channel Preambles and then go to the traffic channel if a BS ACK Order is received from BS 103 before all of the Traffic Channel Preambles are sent. |

A three (3) bit "Number of Preambles" field is added to the Extended Channel Assignment Message (ECAM). The Number of Preambles is a configurable parameter that specifies to MS 112 how many Traffic Channel Preambles it is to send. Note that the Number of Preambles may be set to zero (i.e., no Traffic Channel is to be sent). A Traffic Channel Preamble is made up of two frames, each of which has a length of one and one quarter millisecond (1.25 msec). The following table shows the "Number of Preambles" field for the fast call set-up procedure.

TABLE TWO

| Number of Preambles (Binary) | Number of Preambles (Decimal) | Preamble Length (1.25 msec increments) |
| --- | --- | --- |
| 000 | 0 | 0 |
| 001 | 1 | 2 |
| 010 | 2 | 4 |
| 011 | 3 | 6 |
| 100 | 4 | 8 |
| 101 | 5 | 10 |
| 110 | 6 | 12 |
| 111 | 7 | 14 |

Figure 5:
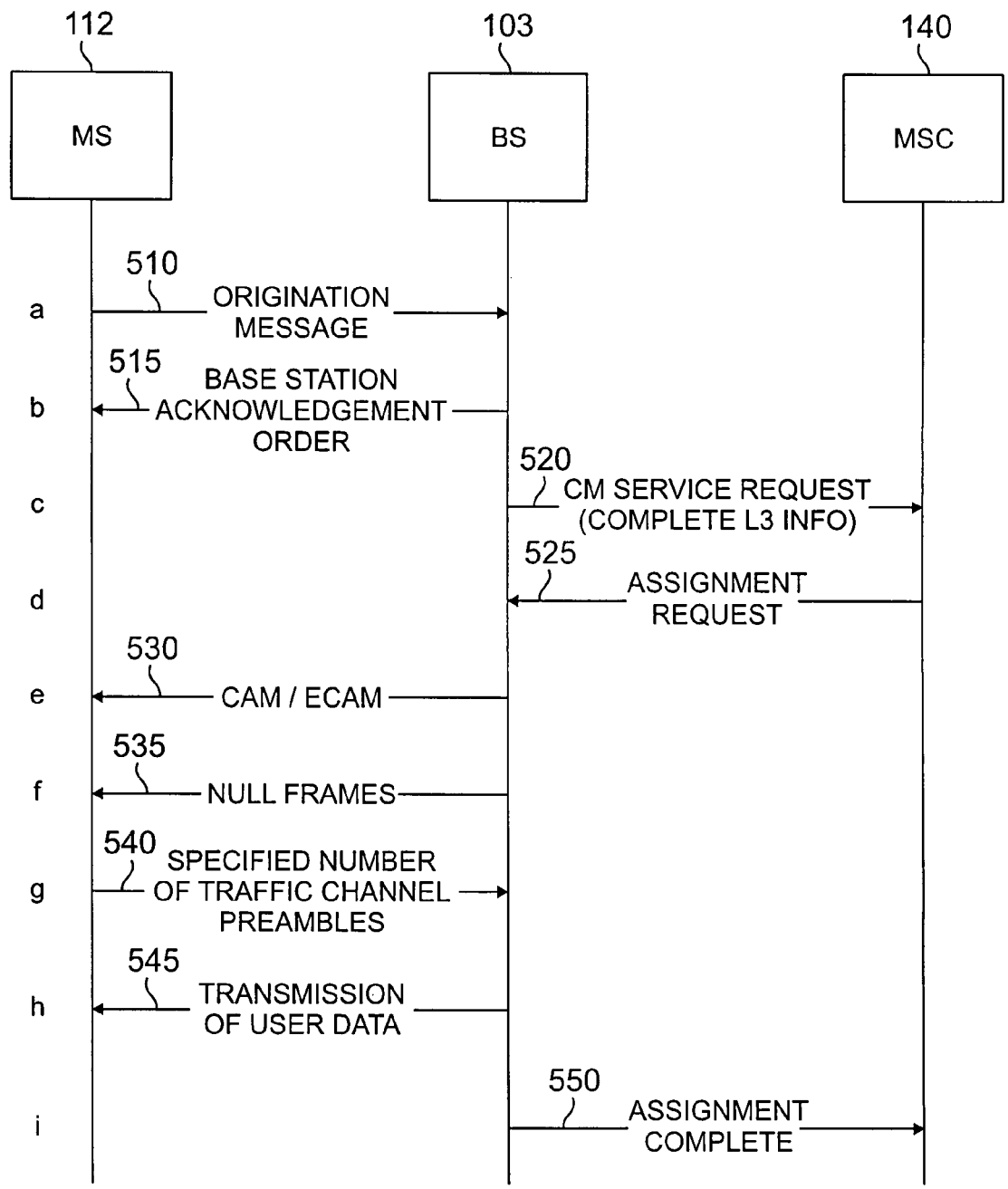
FIG. 5 illustrates a chart of call flows showing an advantageous embodiment of a second method of a fast call set-up procedure of the present invention for originating a call from a mobile station in a wireless network.

Consider an example in which the "Mode of Operation" bits "01" and the "Number of Preambles" parameter is set to "101" (i.e., five (5) decimal). FIG. 5 illustrates this example. As in the case described for FIG. 4, mobile station (MS) 112 is approaching base station (BS) 103 in the manner shown in FIG. 1. At time "a" MS 112 sends an Origination Message 510 to BS 103 on a reverse traffic channel. At time "b" BS 103 sends a Base Station Acknowledgement Order 515 to MS 112.

At time "c" BS 103 constructs a Configuration Management (CM) Service Request message 520 and sends it to mobile switching center (MSC) 140 in a Complete Layer 3 (L3) information message. BS 103 may request MSC 140 to allocate a preferred terrestrial circuit. If a global challenge is used, MSC 140 will continue to set up the call while waiting to receive authentication information. If MSC 140 receives an authentication failure indication, then MSC 140 may clear the call.

At time "d" MSC 140 sends an Assignment Request message 525 to BS 103 to request assignment of resources. Assignment Request message 525 includes information concerning the terrestrial circuit, if a terrestrial circuit is to be used between BS 103 and MSC 140. If a traffic channel is available for the call, at time "e" base station 103 sends a Channel Assignment Message (CAM) 530 (Granted Mode=10) or an Extended Channel Assignment Message (ECAM) 530 (Granted Mode=11) over the Paging Channel to MS 112 to initiate the establishment of a radio traffic channel. The Mode of Operation bits in ECAM 530 are set to "01" and the Number of Preambles bits are set to "101" (i.e. five (5) decimal).

At time "f" BS 103 sends null frames 535 to MS 112 on the forward traffic channel. As soon as MS 112 finds good null frames 435 on the forward traffic channel, MS 112 will start transmitting five (5) Traffic Channel Preamble messages 540 to BS 103 on the reverse traffic channel. After MS 112 has transmitted the five (5) Traffic Channel Preamble messages 540, then MS 112 will immediately go to the traffic channel and send traffic. This is represented by the transmission at time "h" where MS 112 sends Transmission of User Data 545 to BS 103.

After BS 103 receives the Transmission of User Data 545 from MS 112, at time "i" BS 103 sends an Assignment Complete message 550 to MSC 140. In the "01" mode of operation BS 103 does not have to acknowledge whether it received the traffic channel by explicitly sending a BS Acknowledgement Order to MS 112. As previously noted, the number of specified Traffic Channel Preambles to be sent by MS 112 may be chosen to be zero.

Figure 6:
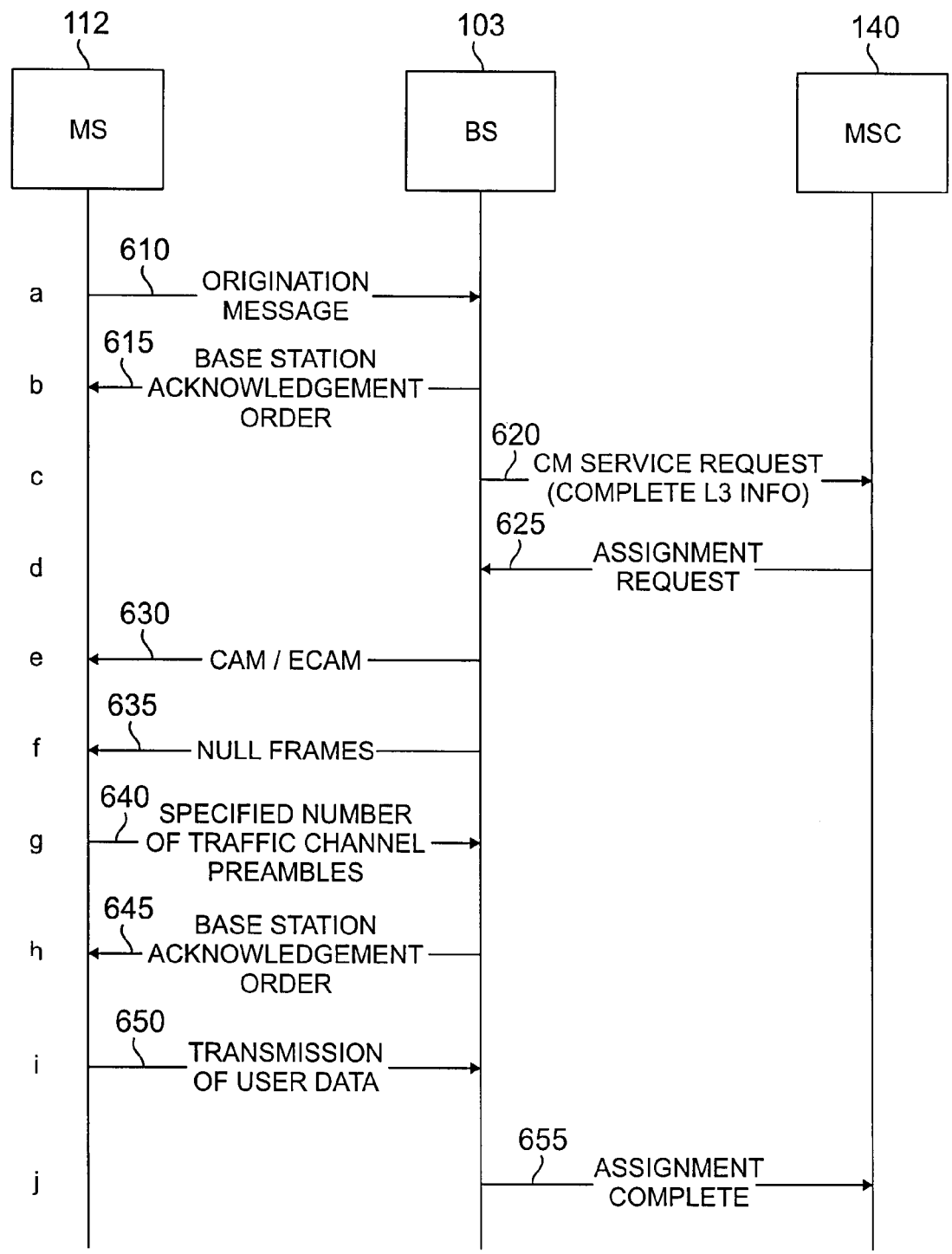
FIG. 6 illustrates a chart of call flows showing an advantageous embodiment of an alternate version of the second method of a fast call set-up procedure of the present invention for originating a call from a mobile station in a wireless network.

Now consider an example in which the "Mode of Operation" bits are set to "10" and the "Number of Preambles" parameter is set to "101" (i.e., five (5) decimal). FIG. 6 illustrates this example. As in the case described for FIG. 4, mobile station (MS) 112 is approaching base station (BS) 103 in the manner shown in FIG. 1. At time "a" MS 112 sends an Origination Message 610 to BS 103 on a reverse traffic channel. At time "b" BS 103 sends a Base Station Acknowledgement Order 615 to MS 112.

At time "c" BS 103 constructs a Configuration Management (CM) Service Request message 620 and sends it to mobile switching center (MSC) 140 in a Complete Layer 3 (L3) information message. BS 103 may request MSC 140 to allocate a preferred terrestrial circuit. If a global challenge is used, MSC 140 will continue to set up the call while waiting to receive authentication information. If MSC 140 receives an authentication failure indication, then MSC 140 may clear the call.

At time "d" MSC 140 sends an Assignment Request message 625 to BS 103 to request assignment of resources. Assignment Request message 625 includes information concerning the terrestrial circuit, if a terrestrial circuit is to be used between BS 103 and MSC 140. If a traffic channel is available for the call, at time "e" base station 103 sends a Channel Assignment Message (CAM) 630 (Granted Mode=10) or an Extended Channel Assignment Message (ECAM) 630 (Granted Mode=11) over the Paging Channel to MS 112 to initiate the establishment of a radio traffic channel. The Mode of Operation bits in ECAM 530 are set to "10" and the Number of Preambles bits are set to "101" (i.e. five (5) decimal).

At time "f" BS 103 sends null frames 635 to MS 112 on the forward traffic channel. As soon as MS 112 finds good null frames 435 on the forward traffic channel, MS 112 will start transmitting (at time "g") five (5) Traffic Channel Preamble messages 640 to BS 103 on the reverse traffic channel. If MS 112 succeeds in transmitting the five (5) Traffic Channel Preamble messages 640, then MS 112 will immediately go to the traffic channel and send traffic.

In this example BS 103 receives two (2) of the Traffic Channel Preamble messages 640 from MS 112 and then (at time "h") sends a Base Station Acknowledgement Order 645 to MS 112. MS 112 may then go immediately to the traffic channel and send traffic. This is represented by the transmission at time "i" where MS 112 sends Transmission of User Data 650 to BS 103.

After BS 103 receives the Transmission of User Data 650 from MS 112, at time "j" BS 103 sends an Assignment Complete message 655 to MSC 140. In the "10" mode of operation BS 103 does acknowledge that it received the traffic channel by explicitly sending a BS Acknowledgement Order 645 to MS 112. The BS Acknowledgement Order 645 indicates that BS 103 has successfully received fewer than the specified number of Traffic Channel Preambles. In this example BS 103 send BS Acknowledgement Order 645 after BS 103 received two (2) of the five (5) Traffic Channel Preambles. It is understood that these specific numbers (2 and 5) are merely examples and that the invention is not limited to the numbers used in this example.

Figure 7:
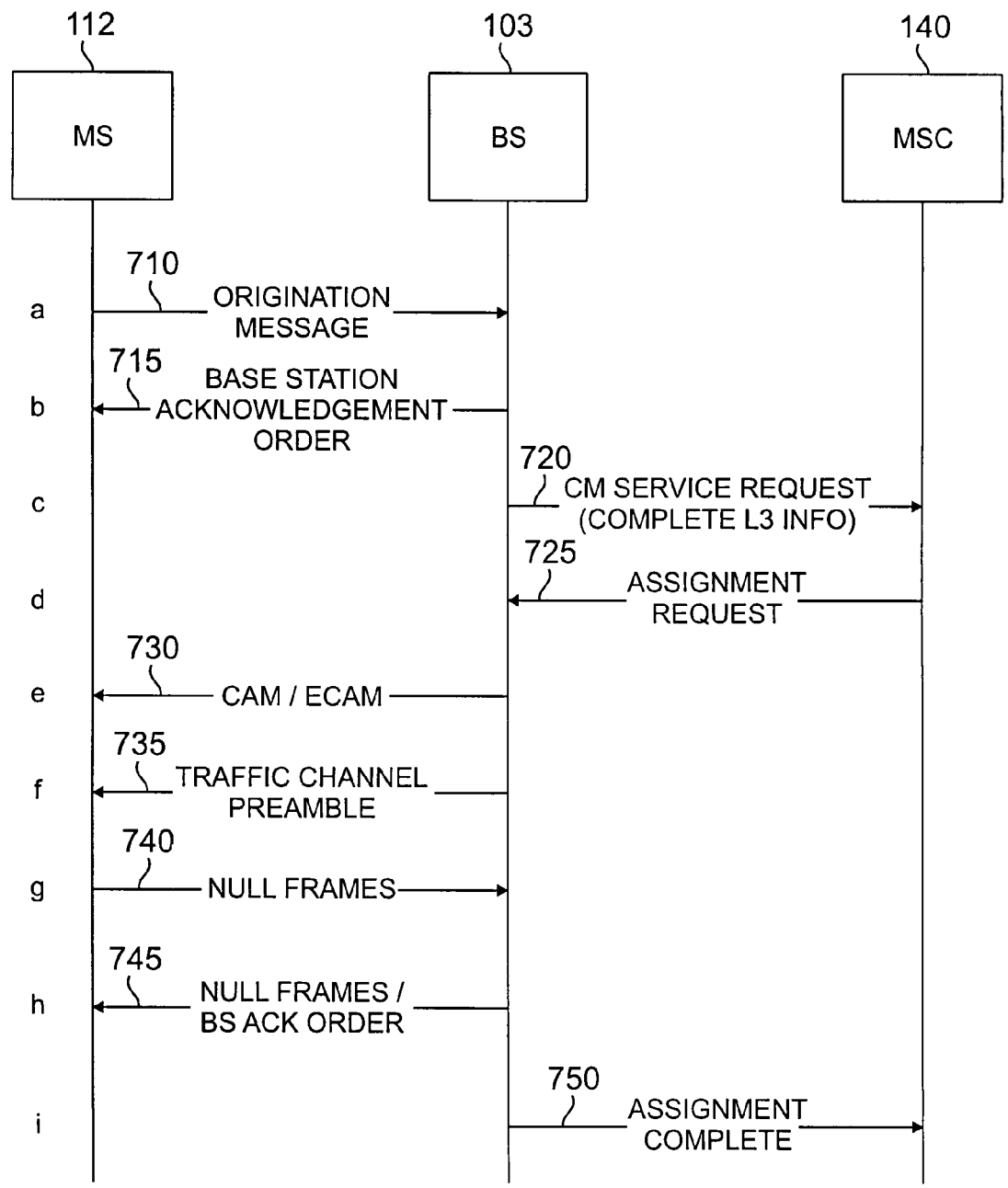
FIG. 7 illustrates a chart of call flows showing an advantageous embodiment of a third method of a fast call set-up procedure of the present invention for originating a call from a mobile station in a wireless network.

FIG. 7 illustrates a chart of call flows showing an advantageous embodiment of a third method of operation for providing a fast call set-up procedure of the present invention. In the third method after BS 103 sends a CAM/ECAM message to MS 112, BS 103 sends a Traffic Channel Preamble message to MS 112 instead of null frames. In response, MS 112 sends back null frames instead of a Traffic Channel Preamble Message.

The traffic channel can only carry the null frames. This third method of the present invention takes advantage of the fact that transmitting null frames is more reliable than transmitting an acknowledgement (ACK) order. If an acknowledgment (ACK) order misses, then there has to be another transmission. This requires additional time. Therefore, in this third method, after BS 103 receives the null frames from MS 112 (which serve the function of a Traffic Channel Preamble) BS 103 immediately transmits null frames to MS 112 in the forward traffic channel. The null frames serve the function of a Base Station Acknowledgement Order. Immediate acquisition is possible because the null frames are a continuous stream of bits.

Consider the following example of the operation of the third method of the present invention as shown in FIG. 7. As in the case described for FIG. 4, mobile station (MS) 112 is approaching base station (BS) 103 in the manner shown in FIG. 1. At time "a" MS 112 sends an Origination Message 710 to BS 103 on a reverse traffic channel. At time "b" BS 103 sends a Base Station Acknowledgement Order 715 to MS 112.

At time "c" BS 103 constructs a Configuration Management (CM) Service Request message 720 and sends it to mobile switching center (MSC) 140 in a Complete Layer 3 (L3) information message. BS 103 may request MSC 140 to allocate a preferred terrestrial circuit. If a global challenge is used, MSC 140 will continue to set up the call while waiting to receive authentication information. If MSC 140 receives an authentication failure indication, then MSC 140 may clear the call.

At time "d" MSC 140 sends an Assignment Request message 725 to BS 103 to request assignment of resources. Assignment Request message 725 includes information concerning the terrestrial circuit, if a terrestrial circuit is to be used between BS 103 and MSC 140. If a traffic channel is available for the call, at time "e" base station 103 sends a Channel Assignment Message (CAM) 630 (Granted Mode=10) or an Extended Channel Assignment Message (ECAM) 630 (Granted Mode=11) over the Paging Channel to MS 112 to initiate the establishment of a radio traffic channel.

At time "f" BS 103 sends a Traffic Channel Preamble 735 to MS 112 on the forward traffic channel. As soon as MS 112 receives the Traffic Channel Preamble 735 on the forward traffic channel, MS 112 will start transmitting (at time "g") null frames 740 to BS 103 on the reverse traffic channel.

At time "h" BS 103 sends null frames 745 to MS 112. The null frames 745 serve the function of a Base Station Acknowledgement Order. At time "i" BS 103 sends an Assignment Complete message 750 to MSC 140.

The previous examples have illustrated advantageous embodiments of the fast call set-up procedure of the present invention for originating a call from a mobile station. The present invention also provides a system and method for providing a fast call set-up procedure for terminating a call to a mobile station. To better understand the invention, a typical prior art call termination procedure will first be described.

Figure 8:
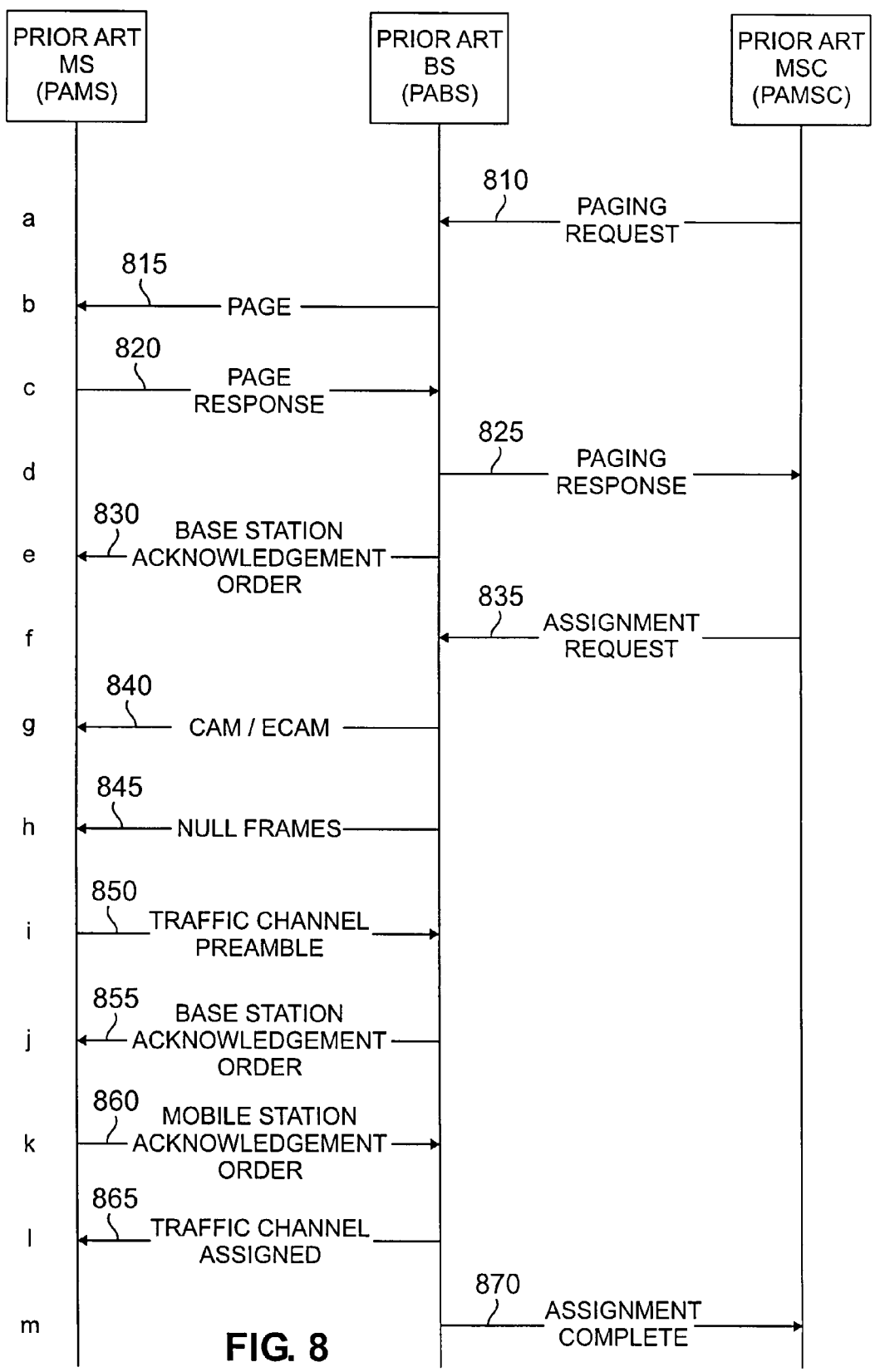
FIG. 8 illustrates a chart of call flows showing a prior art call set-up procedure for terminating an incoming call to a mobile station in a wireless network.

FIG. 8 illustrates a chart of call flows showing a typical prior art call set-up procedure for terminating an incoming call to a prior art mobile station (referred to as PAMS). Assume that the prior art mobile station PAMS is approaching a prior art base station (referred to as PABS) in the same manner as mobile station 112 is approaching base station 103 as shown in FIG. 1. Further assume that the prior art mobile switching center (referred to as PAMSC) determines that an incoming call terminates to the prior art mobile station PAMS.

At time "a" mobile switching center PAMSC sends a Paging Request message 810 to base station PABS. At time "b" base station PABS sends a Page message 815 to mobile station PAMS. At time "c" mobile station PAMS sends a Page Response message 820 to base station PABS. At time "d" base station PABS sends a Paging Response message 825 to mobile switching center PAMSC.

At time "e" base station PABS sends a Base Station Acknowledgement Order 830 to mobile station PAMS on a forward traffic channel. At time "f" mobile switching center PAMSC sends an Assignment Request message 835 to base station PABS. At time "g" base station PABS sends a Channel Assignment Message (CAM) 840 or an Extended Channel Assignment Message (ECAM) 840 to mobile station PAMS. At time "h" base station PABS sends null frames 845 to mobile station PAMS. At time "i" mobile station PAMS sends a Traffic Channel Preamble 850 to base station PABS in a reverse traffic channel.

In response, at time "j" base station PABS sends a Base Station Acknowledgement Order 855 back to mobile station PAMS. Then at time "k" mobile station PAMS sends a Mobile Station Acknowledgment Order 860 back to base station PABS. At time "l" base station PABS sends a Traffic Channel Assigned message 865 to mobile station PAMS. Finally, at time "m" base station PABS sends an Assignment Complete message 870 to mobile switching center PAMSC. These typical prior art call set-up messages for terminating a call to a mobile station require a total of approximately two (2) to three (3) seconds.

The present invention is able to perform a fast call set-up procedure for terminating an incoming call in significantly less time than the time required by prior art systems. In particular, the present invention can reduce the call set-up time for terminating an incoming call to less than approximately one fourth (¼) of the typical prior art call set-up time for terminating an incoming call.

Figure 9:
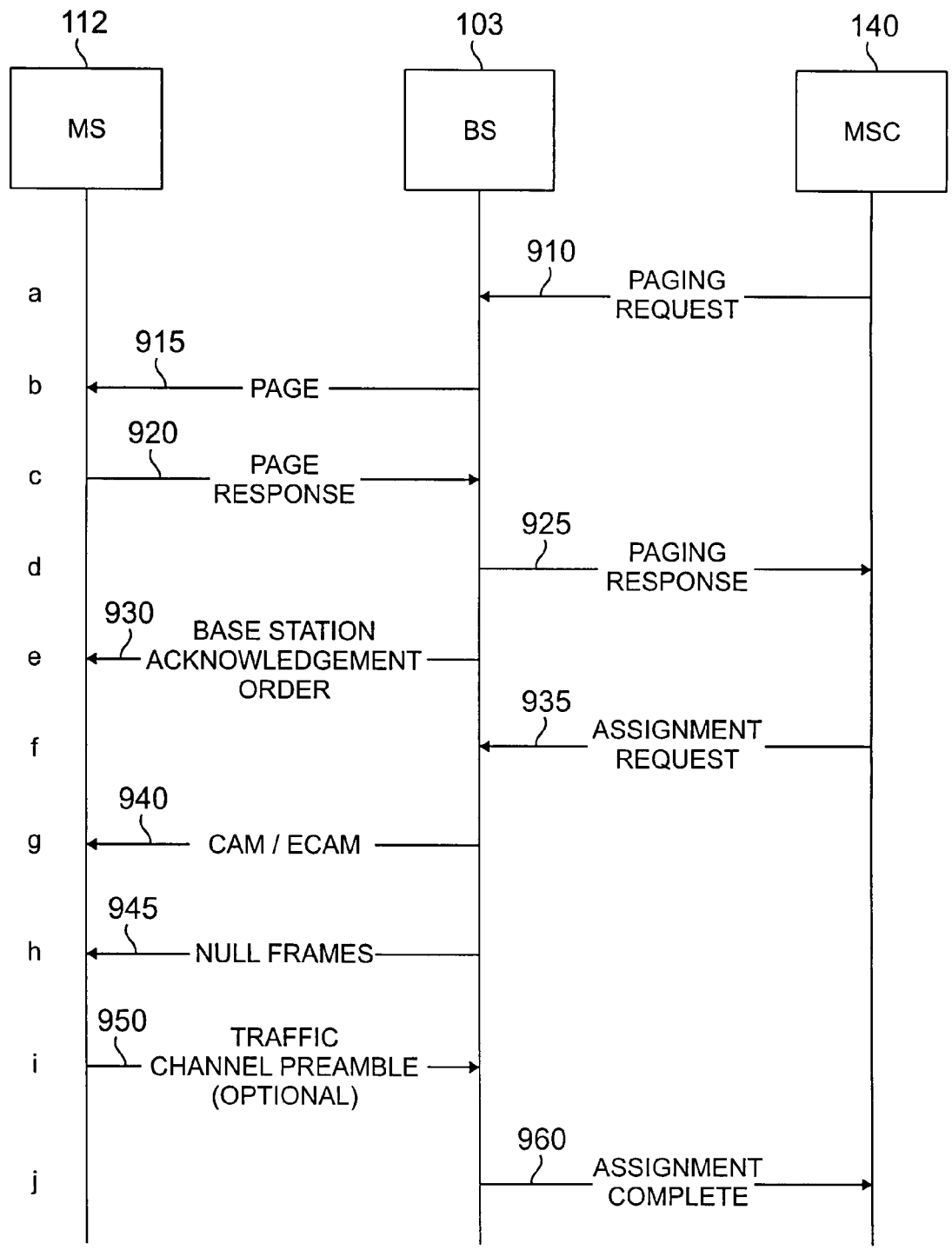
FIG. 9 illustrates a chart of call flows showing an advantageous embodiment of a fast call set-up procedure of the present invention for terminating an incoming call to a mobile station in a wireless network.

Consider the advantageous embodiment of the fast call set-up procedure of the present invention shown in FIG. 9 for terminating an incoming call to a mobile station. Mobile station (MS) 112 of the present invention is approaching base station (BS) 103 of the present invention in the manner shown in FIG. 1. At time "a" mobile switching center MSC 140 sends a Paging Request message 910 to base station BS 103. At time "b" BS 103 sends a Page message 915 to mobile station MS 112 over the paging channel. At time "c" MS 112 acknowledges the page by sending a Page Response message 920 to BS 103 over the access channel. At time "d" BS 103 constructs and sends a Paging Response message 925, places it in a Complete Layer 3 (Le) Information message, and sends it to MSC 140. BS 103 may request MSC 140 to allocate a preferred terrestrial channel.

At time "e" BS 103 acknowledges the receipt of the Page Response message by sending a Base Station Acknowledgement Order 930 to MS 112 on a forward traffic channel. At time "f" MSC 140 sends an Assignment Request message 935 to BS 103 to request assignment of resources. At time "g" BS 103 sends a Channel Assignment Message (CAM) 940 (Granted Mode=10) or an Extended Channel Assignment Message (ECAM) 940 (Granted Mode=11) to MS 112 to initiate the establishment of a radio traffic channel.

At time "h" BS 103 sends null frames 945 to MS 112 on the forward traffic channel. As soon as MS 112 finds good null frames 945 on the forward traffic channel, MS 112 will start transmitting a Traffic Channel Preamble message 950 on the reverse traffic channel. Therefore, at time "i" MS 112 sends the Traffic Channel Preamble message 950 to BS 103 over the designated reverse traffic channel. The Traffic Channel Preamble 950 is optional. That is, Traffic Channel Preamble 950 may or may not be sent. After BS 103 acquires the reverse traffic channel, BS 103 (at time "j") sends an Assignment Complete message 960 to MSC 140.

The fast call set-up procedure of the present invention for terminating an incoming call differs from the prior art call set-up procedure for terminating an incoming call described with reference to FIG. 8. In the fast call set-up procedure of the present invention the Base Station Acknowledgement Order 855, the Mobile Station Acknowledgement Order 860, and the Traffic Channel Assigned message 865 of the prior art procedure are omitted. After BS 103 receives (optional) Traffic Channel Preamble message 950 from MS 112, at time "j" BS 103 sends an Assignment Complete message 960 to MSC 140. At this time BS 103 considers the call to be in a conversation state. In prior art call set-up procedures a call is deemed to be completed when a Service Connect Completion Message (not shown in FIG. 8) is issued.

The total time interval for the fast call set-up described in FIG. 9 is approximately three hundred milliseconds (300 msec). The time interval between the Paging Request message 910 from MSC 140 and the Assignment Request message 935 from MSC 140 is approximately two hundred milliseconds (200 msec). The time interval that is actually observed will depend upon the speed of MSC 140. The time interval between the CAM/ECAM message 940 from BS 103 and the Assignment Complete message 960 from BS 103 is approximately one hundred milliseconds (100 msec). It is possible to reduce this time interval to as little as eighty milliseconds (80 msec).

The present invention removes the prior art Base Station Acknowledgement Order 855 ("BS ACK Order 855"). The prior art BS ACK Order 855 is used to determine whether the forward traffic channel link is reliable. In the present invention the null frames 945 sent with the CAM/ECAM message 940 in the forward traffic channel perform this function.

The present invention removes the prior art Mobile Station Acknowledgement Order 860 ("MS ACK Order 860"). The prior art MS ACK Order 860 is used to determine whether the reverse traffic channel link is reliable. In the present invention the Traffic Channel Preamble message 950 may perform this function. In addition, the present invention removes the prior art Traffic Channel Assigned message 865. The reduction in the time interval required to set up a call terminated to a mobile station is obtained (1) by removing the BS ACK Order 855 and the MS ACK Order 860, and (2) by removing prior art service negotiations between a Service Connect Message (SCM) and a Service Connect Completion Message (SCCM). The Service Connect Message (SCM) and the Service Connect Completion Message (SCCM) are not shown in FIG. 8.

The system and method of the present invention are capable of working with certain of the techniques presently described in the CDMA standards. The system and method of the present invention can considerably reduce the call set-up time by using the Granted Mode=10 feature. When Granted Mode=10, the mobile station uses an initial service configuration that consists of a default multiplex option and transmission rates that correspond to the service option requested by the mobile station. The service option may be requested either in the origination message or in the page response message. Granted Mode=10 also provides that service configuration is not to take place before the base station sends the first service connect message.

In addition, if the SERV_NEG (Service Negotiation) is enabled and the GRANTED_MODE field of the CAM and ECAM is set to "10", then the base station should send a Service Connect Message. The CDMA Standards do not make the sending of a Service Connect Message mandatory. Therefore, the Service Connect Message (SCM) and the Service Connect Completion Message (SCCM) and the service negotiations may be eliminated. One technique to avoid the service negotiations would be to have the default mobile configuration set to the operator preferred settings.

The system and method of the present invention can also considerably reduce the call set-up time by using the Granted Mode=11 feature. The Granted Mode=11 is set in the ECAM and in the SR_ID_Restore field (Service Identifier Restore) to tell the mobile station to use the same SCR (Service Configuration Record) parameters and NNSCR (Non Negotiable Service Configuration Record) parameters that are stored in the mobile station's database. The base station gets this information from the SYNC_ID (Signature Code for SCR and NNSCR) that is reported in a origination message, a page response message, or a reconnect message.

The present invention provides faster call set-up times than prior art systems. The present invention also achieves the faster call set-up times while sending and receiving fewer messages on the traffic channel than prior art systems. The present invention therefore provides significant savings in time and provides increased network efficiency.

These examples of the present invention that are set forth in this patent document are merely illustrative. Many other valuable applications of the system and method of the present invention may also be identified. Although the present invention has been described in detail, those skilled in the art should understand that they may make various changes, substitutions and alterations herein without departing from the spirit and scope of the invention in its broadest form.

What is claimed is:

1. For use in a wireless communication system comprising a plurality of base stations, each of which is capable of communicating with a plurality of mobile stations within abase station coverage area, an apparatus for setting up a call from a mobile station, wherein the apparatus comprises:

a base station that sets up said call from said mobile station by receiving an origination message from said mobile station;

wherein said base station sends null frames on a forward traffic channel to said mobile station to verify that said forward traffic channel is reliable instead of sending a base station acknowledgment order to said mobile station to verify that said forward traffic channel is reliable; and wherein said base station receives a traffic channel preamble from said mobile station on a reverse traffic channel to said base station to verify that said reverse traffic channel is reliable instead of receiving a mobile station acknowledgement order from said mobile station to verify that said reverse traffic channel is reliable.

2. The apparatus as set forth in claim 1 wherein:

said base station sends to said mobile station a specified number of traffic channel preambles for said mobile station to send to said base station before said mobile station goes to a traffic channel.

3. The apparatus as set forth in claim 2 wherein said base station sends said specified number of traffic channel preambles to said mobile station in one of a channel assignment message and an extended channel assignment message.

4. The apparatus as set forth in claim 3 wherein said base station sends a mode of operation indicator to said mobile station to cause said mobile station to send a specified number of traffic channel preambles to said base station before said mobile station goes to a traffic channel, wherein said base station sends said mode of operation indicator to said mobile station in one of a channel assignment message and an extended channel assignment message.

5. The apparatus as set forth in claim 1 wherein:
said base station sends to said mobile station a specified number of traffic channel preambles for said mobile station to send to said base station before said mobile station goes to a traffic channel; and
said base station sends a base station acknowledgement order to said mobile station before said mobile station has sent the specified number of traffic channel preambles to said base station.

6. The apparatus as set forth in claim 5 wherein said base station sends said specified number of traffic channel preambles to said mobile station in one of a channel assignment message and an extended channel assignment message.

7. The apparatus as set forth in claim 6 wherein:
said base station sends a mode of operation indicator to said mobile station to cause said mobile station 1) to send a specified number of traffic channel preambles to said base station before said mobile station goes to a traffic channel, and 2) to enter a traffic channel when said mobile station receives a base station acknowledgement order from said base station before said mobile station has sent the specified number of traffic channel preambles to said base station; and
wherein said base station sends said mode of operation indicator to said mobile station in one of a channel assignment message and an extended channel assignment message.

8. The apparatus as set forth in claim 1 wherein:
said base station sends a traffic channel preamble to said mobile station on a forward traffic channel after said base station has sent one of a channel assignment message and an extended channel assignment message to said mobile station, wherein said traffic channel preamble verifies that said forward traffic channel is reliable; and
said base station receives null frames from said mobile station on a reverse traffic channel after said base station has sent said traffic channel preamble to said mobile station, wherein said null frames verify that said reverse traffic channel is reliable.

9. The apparatus as set forth in claim 1 wherein:
said base station sets up a call to terminate on said mobile station by sending null frames on a forward traffic channel to said mobile station to verify that said forward traffic channel is reliable instead of sending a base station acknowledgment order to said mobile station to verify that said forward traffic channel is reliable.

10. The apparatus as set forth in claim 9 wherein:
wherein said base station sets up a call to terminate on said mobile station by receiving a traffic channel preamble from said mobile station on a reverse traffic channel to said base station to verify that said reverse traffic channel is reliable instead of receiving a mobile station acknowledgement order from said mobile station to verify that said reverse traffic channel is reliable.

11. The apparatus as claimed in claim 1 wherein said base station sets up said call from said mobile station in approximately two hundred milliseconds.

12. The apparatus as claimed in claim 9 wherein said base station sets up said call to terminate on said mobile station in approximately three hundred milliseconds.

13. For use in a wireless communication system comprising a plurality of base stations, each of which is capable of communicating with a plurality of mobile stations within a base station coverage area, a method for setting up a call from a mobile station, wherein the method comprises the steps of:
receiving an origination message from said mobile station in a base station;
sending null frames from said base station on a forward traffic channel to said mobile station to verify that said forward traffic channel is reliable instead of sending a base station acknowledgment order to said mobile station to verify that said forward traffic channel is reliable; and
receiving a traffic channel preamble in said base station from said mobile station on a reverse traffic channel to said base station to verify that said reverse traffic channel is reliable instead of receiving a mobile station acknowledgement order from said mobile station to verify that said reverse traffic channel is reliable.

14. The method as set forth in claim 13 further comprising the step of:
sending from said base station to said mobile station a specified number of traffic channel preambles for said mobile station to send to said base station before said mobile station goes to a traffic channel.

15. The method as set forth in claim 14 further comprising the step of sending said specified number of traffic channel preambles from said base station to said mobile station in one of a channel assignment message and an extended channel assignment message.

16. The method as set forth in claim 15 further comprising the steps of:
sending a mode of operation indicator from said base station to said mobile station to cause said mobile station to send a specified number of traffic channel preambles to said base station before said mobile station goes to a traffic channel; and
sending said mode of operation indicator from said base station to said mobile station in one of a channel assignment message and an extended channel assignment message.

17. The method as set forth in claim 13 further comprising the steps of:
sending from said base station to said mobile station a specified number of traffic channel preambles for said mobile station to send to said base station before said mobile station goes to a traffic channel; and
sending a base station acknowledgement order from said base station to said mobile station before said mobile station has sent the specified number of traffic channel preambles to said base station.

18. The method as set forth in claim 17 further comprising the step of:
sending said specified number of traffic channel preambles from said base station to said mobile station in one of a channel assignment message and an extended channel assignment message.

19. The method as set forth in claim 18 further comprising the steps of:

sending a mode of operation indicator from said base station to said mobile station to cause said mobile station 1) to send a specified number of traffic channel preambles to said base station before said mobile station goes to a traffic channel, and 2) to enter a traffic channel when said mobile station receives a base station acknowledgement order from said base station before said mobile station has sent the specified number of traffic channel preambles to said base station; and sending said mode of operation indicator from said base station to said mobile station in one of a channel assignment message and an extended channel assignment message.

20. The method as set forth in claim 13 further comprising the steps of:

sending a traffic channel preamble from said base station to said mobile station on a forward traffic channel after said base station has sent one of a channel assignment message and an extended channel assignment message to said mobile station;

verifying with said traffic channel preamble that said forward traffic channel is reliable;

receiving null frames in said base station from said mobile station on a reverse traffic channel after said base station has sent said traffic channel preamble to said mobile station; and verifying with said null frames that said reverse traffic channel is reliable.

21. The method as set forth in claim 13 further comprising the steps of:

setting up a call to terminate on said mobile station by receiving in said base station a paging request message from a mobile switching center; and sending null frames from said base station on a forward traffic channel to said mobile station to verify that said forward traffic channel is reliable instead of sending a base station acknowledgment order to said mobile station to verify that said forward traffic channel is reliable.

22. The method as set forth in claim 21 further comprising the step of:

receiving a traffic channel preamble in said base station from said mobile station on a reverse traffic channel to said base station to verify that said reverse traffic channel is reliable instead of receiving a mobile station acknowledgement order from said mobile station to verify that said reverse traffic channel is reliable.

23. The method as set forth in claim 13 wherein said base station sets up said call from said mobile station in approximately two hundred milliseconds.

24. The method as set forth in claim 21 wherein said base station sets up said call to terminate on said mobile station in approximately three hundred milliseconds.

25. For use in a wireless communication system comprising a plurality of base stations, each of which is capable of communicating with a plurality of mobile stations within a base station coverage area, an apparatus for setting up a call from a mobile station, wherein the apparatus comprises:

a mobile station that sets up said call from said mobile station by sending an origination message to said base station;

wherein said mobile station receives null frames on a forward traffic channel from said base station to verify that said forward traffic channel is reliable instead of receiving a base station acknowledgment order from said base station to verify that said forward traffic channel is reliable; and wherein said mobile station sends a traffic channel preamble on a reverse traffic channel to said base station to verify that said reverse traffic channel is reliable instead of sending a mobile station acknowledgement order from said mobile station to verify that said reverse traffic channel is reliable.

26. The apparatus as claimed in claim 25 wherein said mobile station receives from said base station a specified number of traffic channel preambles to send to said base station before said mobile station goes to a traffic channel.

27. The apparatus as claimed in claim 26 wherein said mobile station receives from said base station a mode of operation indicator to cause said mobile station to send a specified number of traffic channel preambles to said base station before said mobile station goes to a traffic channel.

28. The apparatus as claimed in claim 27 wherein said mobile station receives from said base station a mode of operation indicator to cause said mobile station to go to a traffic channel when said mobile station receives a base station acknowledgment order from said base station before said mobile station has sent the specified number of traffic channel preambles to said base station.

29. The apparatus as claimed in claim 25 wherein said mobile station sets up a call to terminate on said mobile station by receiving null frames on a forward traffic channel from said base station to verify that said forward traffic channel is reliable instead of receiving a base station acknowledgement order from said base station to verify that said forward traffic channel is reliable.

30. The apparatus as claimed in claim 29 wherein said mobile station sets up a call to terminate on said mobile station by sending a traffic channel preamble to said base station on a reverse traffic channel from said mobile station to verify that said reverse traffic channel is reliable instead of sending a mobile station acknowledgement order from said mobile station to said base station to verify that said reverse traffic channel is reliable.

\* \* \* \* \*

UNITED STATES PATENT AND TRADEMARK OFFICE
CERTIFICATE OF CORRECTION

| | | |
|---|---|---|
| PATENT NO. | : 7,317,920 B2 | Page 1 of 1 |
| APPLICATION NO. | : 10/659449 | |
| DATED | : January 8, 2008 | |
| INVENTOR(S) | : Purva R. Rajkotia, Jey Veerasamy and Sanjaykumar Kodali | |

It is certified that error appears in the above-identified patent and that said Letters Patent is hereby corrected as shown below:

Column 16, claim 1, line 44, delete "abase" and replace with --a base--.

Signed and Sealed this

Nineteenth Day of May, 2009

JOHN DOLL
*Acting Director of the United States Patent and Trademark Office*